US009223440B2

(12) United States Patent
Lim et al.

(10) Patent No.: US 9,223,440 B2
(45) Date of Patent: Dec. 29, 2015

(54) OPTICAL NAVIGATION UTILIZING SPEED BASED ALGORITHM SELECTION

(75) Inventors: Lay Cheng Jessie Lim, Penang (MY); Boon How Kok, Penang (MY); Ming Yong Mau, Penang (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 308 days.

(21) Appl. No.: 13/170,604

(22) Filed: Jun. 28, 2011

(65) Prior Publication Data

US 2013/0002609 A1 Jan. 3, 2013

(51) Int. Cl.
G06F 3/033 (2013.01)
G06F 3/045 (2006.01)
G06K 9/00 (2006.01)
G06F 3/042 (2006.01)
G06F 3/041 (2006.01)

(52) U.S. Cl.
CPC ............. *G06F 3/042* (2013.01); *G06F 3/0416* (2013.01)

(58) Field of Classification Search
CPC ..... G06F 3/0421; G06F 3/0412; G06F 3/042; G06F 3/03545; G06F 3/0317; G06F 3/044; G06F 3/045; G06F 3/0416; G06F 3/046
USPC .................. 345/163–167, 175; 715/856–858; 702/194
See application file for complete search history.

(56) References Cited

U.S. PATENT DOCUMENTS

| 5,644,139 | A | 7/1997 | Allen et al. |
| 6,222,174 | B1 | 4/2001 | Tullis et al. |
| 7,800,594 | B2 | 9/2010 | Nakamura et al. |
| 7,903,097 | B2 * | 3/2011 | Watari ........................... 345/175 |
| 8,224,622 | B2 * | 7/2012 | Kumar et al. ................. 702/179 |
| 8,493,334 | B2 | 7/2013 | Takashima et al. |
| 8,576,168 | B2 | 11/2013 | Kabasawa et al. |
| 2004/0208348 | A1 * | 10/2004 | Baharav et al. ............... 382/124 |
| 2007/0143383 | A1 * | 6/2007 | Xu et al. ....................... 708/200 |

(Continued)

FOREIGN PATENT DOCUMENTS

| CN | 101344828 | | 1/2009 |
| CN | 101606119 | | 12/2009 |
| CN | 101813983 | A | 8/2010 |
| TW | 200500881 | | 1/2005 |
| TW | 200724921 | | 7/2007 |

OTHER PUBLICATIONS

University of South Florida, Midpoint, 2012.*

(Continued)

*Primary Examiner* — Lixi C Simpson
*Assistant Examiner* — Ngan Pham Lu

(57) ABSTRACT

Embodiments of method and systems are disclosed. An embodiment of a method for optical navigation involves generating light at a light source, directing the light to a navigation surface, detecting light reflected from the navigation surface toward a sensor array, and generating movement information, which is indicative of movement of the navigation surface relative to the sensor array, in response to the detected light. Generating the movement information involves determining the speed of the movement, comparing the speed of the movement to a movement threshold, selecting a processing algorithm from a plurality of processing algorithms in response to the comparison, and processing the movement information according to the selected processing algorithm. In an embodiment, the processing algorithms include an adaptive navigation algorithm and a sensor resolution adjustment algorithm.

9 Claims, 6 Drawing Sheets

(56) References Cited

U.S. PATENT DOCUMENTS

| | | | |
|---|---|---|---|
| 2009/0195503 A1* | 8/2009 | Lee et al. | 345/166 |
| 2010/0073327 A1 | 3/2010 | Mau et al. | |
| 2010/0079411 A1 | 4/2010 | Lee et al. | |
| 2010/0171712 A1* | 7/2010 | Cieplinski et al. | 345/173 |
| 2011/0069040 A1* | 3/2011 | Ito et al. | 345/178 |
| 2011/0316812 A1* | 12/2011 | Engla Syam | 345/175 |
| 2012/0007826 A1* | 1/2012 | Zheng | 345/174 |

OTHER PUBLICATIONS

AVAGO Technologies, A320 Optical Finger Navigation Sensor, Application Note 5423, Jun. 29, 2009, p. 1-21.

Official Action for China Patent Application No. 201210229921.6, dated May 19, 2015 18 pages.

Officail Action for Taiwan Patent Application No. 101116267, dated Aug. 18, 2015.

* cited by examiner

OPTICAL NAVIGATION UTILIZING SPEED BASED ALGORITHM SELECTION

BACKGROUND

Optical navigation devices use a light source to illuminate a surface, such as user's finger or a desktop, and a sensor array to generate digital images from light that is reflected off of the surface. Successive digital images are compared to each other to compute relative movement information. Typical optical navigation systems output two-dimensional movement information that represents the two-dimensional movement of the surface relative to the sensor array. The two-dimensional movement information is then used to move a cursor on a display of a corresponding computing device. Various techniques are available for generating and processing movement information in optical navigation devices. While various techniques are available for generating and processing movement information, some techniques produce better results under different operating conditions.

SUMMARY

Embodiments of method and systems are disclosed. An embodiment of a method for optical navigation involves generating light at a light source, directing the light to a navigation surface, detecting light reflected from the navigation surface toward a sensor array, and generating movement information, which is indicative of movement of the navigation surface relative to the sensor array, in response to the detected light. Generating the movement information involves determining the speed of the movement, comparing the speed of the movement to a movement threshold, selecting a processing algorithm from a plurality of processing algorithms in response to the comparison, and processing the movement information according to the selected processing algorithm. In an embodiment, the processing algorithms include an adaptive navigation algorithm and a sensor resolution adjustment algorithm.

An embodiment of a user input device includes a light source, a sensor array, a navigation engine, and a microcontroller. The light source is configured to provide light from the light source to a navigation surface, the sensor array configured to detect light reflected from a navigation surface, and the navigation engine is coupled to the sensor array and configured to generate movement information, which is indicative of movement of the navigation surface relative to the sensor array, in response to the detected light. The microcontroller is connected to received the movement information from the navigation engine and is configured to determine the speed of the movement across the navigation surface, compare the speed of the movement to a movement threshold, select a processing algorithm from a plurality of processing algorithms in response to the comparison, and process the movement information according to the selected processing algorithm. In an embodiment, the processing algorithms include an adaptive navigation algorithm and a sensor resolution adjustment algorithm.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
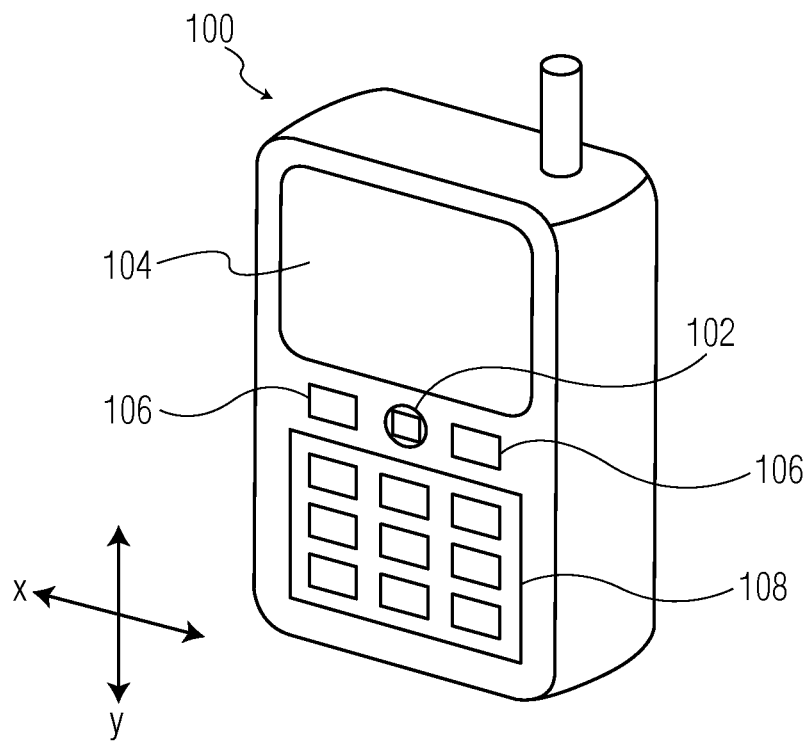
FIG. 1 depicts a hand-held computing device that includes an optical finger navigation device as a user input device.

FIG. 1 depicts a computing device 100 that includes an optical navigation device 102 as a user input device. The optical navigation device and corresponding optical navigation techniques are described in more detail below. The computing device also includes a display device 104, function keys 106, and an alphanumeric keypad 108. The computing device provides a graphical user interface on the display device and the optical navigation device is used to navigate within the graphical user interface. Although a particular computing device is depicted as an example of a computing device that could utilize an optical navigation device, an optical navigation device can be used within other types of computing devices, such as laptop computers, desktop computers, smart phones, global positioning system (GPS) devices, personal music players, PDAs, and other configurations of the hand-held computing device. In an embodiment, the optical navigation device is an optical finger navigation device and in another embodiment, the optical navigation device is an optical mouse. Other embodiments of the optical navigation device are possible.

The optical navigation device 102 facilitates user input to navigate content on the display device 104 of the computing device 100. For example, the optical navigation device facilitates control of a navigation indicator within a graphical user interface that is displayed on the display device. The navigation indicator may be a cursor, a highlighter, an arrow, or another type of navigation indicator. Additionally, the user input received through the optical navigation device may facilitate other types of user-controlled functionality including, but not limited to, volume controls, audio playback selections, browser controls, and so forth. The type of user-controlled functionality that may be implemented with embodiments of the optical navigation device depends on the type of functionality generally provided by the computing device. Also, although FIG. 1 specifically illustrates a hand-held computing device, the optical navigation device may be used in electronic devices which are portable, but not necessarily held in a user's hand, or devices which are generally considered to be not portable.

Figure 2:
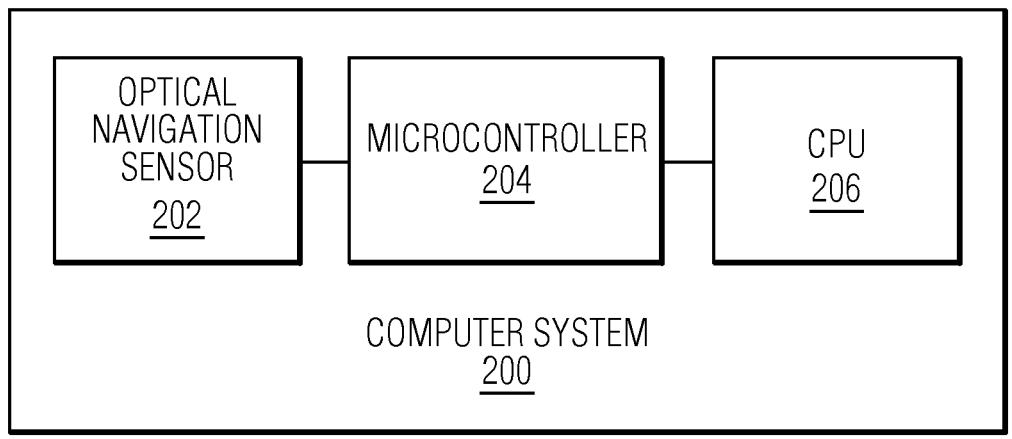
FIG. 2 depicts a functional block diagram of an embodiment of a computer system, such as the hand-held computing device of FIG. 1, which includes an optical navigation sensor, a microcontroller, and a central processing unit.

FIG. 2 depicts an embodiment of a computer system 200 that includes an optical navigation sensor 202, a microcontroller 204, and a central processing unit (CPU) 206. The computer system may be a hand-held computing device such as the computing device 100 of FIG. 1. For example, the optical sensor and the microcontroller may be components of the optical navigation device 102 and the CPU may be the CPU for the computing device. In an embodiment, the optical navigation sensor and microcontroller are packaged together into an optical finger navigation device component that is embedded within the computing device 100 and the microcontroller communicates data to the CPU via a data bus. In another embodiment, the optical navigation sensor and the microcontroller are packaged together into an optical mouse, the CPU is part of a computing device such as a desktop or laptop computer, and the microcontroller communicates with the CPU via a wired or wireless connection. In an embodiment, the microcontroller is an integrated circuit that includes a processor core and memory, where the memory typically includes read only memory (ROM) and a relatively small amount of random access memory (RAM).

In operation, the optical navigation sensor 202 generates movement data, referred to herein as "native" movement information and provides the native movement information to the microcontroller 204. The microcontroller processes the native movement information and outputs processed movement information to the CPU 206. In an embodiment, the movement information is communicated in the form of movement vectors in the x and y directions (e.g., DX and DY), referred to herein as "lateral" movement, where the x and y directions are indicated by the x and y axes in FIG. 1. In other embodiments, the movement information may reflect one-dimensional movement or the movement information may reflect three-dimensional movement. In accordance with an embodiment of the invention, the native movement information is processed by the microcontroller to provide smooth movement tracking under various different tracking speed conditions. Example embodiments of processing techniques are described below.

Figure 3:
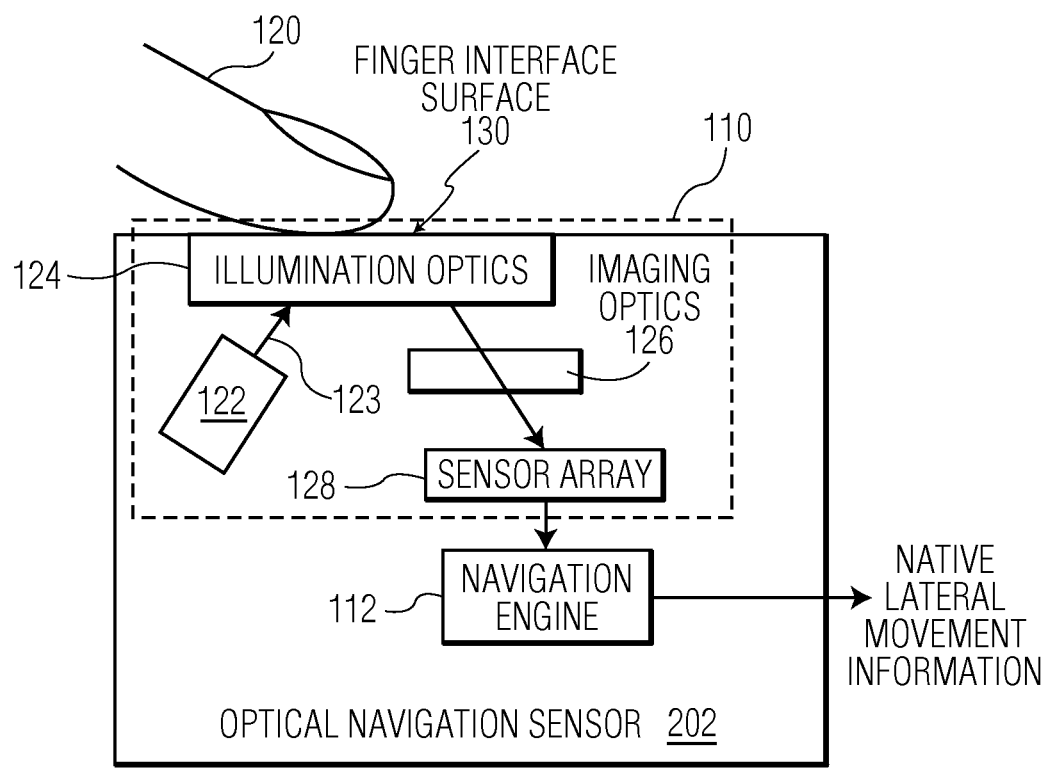
FIG. 3 depicts and expanded view of an embodiment of the optical navigation sensor of FIG. 2.

FIG. 3 depicts an embodiment of the optical navigation sensor 202 from FIG. 2. The optical navigation sensor of FIG. 3 includes an imaging system 110 and a navigation engine 112. The imaging system is configured to collect image information related to a finger 120 or other navigation surface and includes a light source 122, illumination optics 124, imaging optics 126, and a sensor array 128.

The light source 122 of the imaging system 110 can be any suitable source of electromagnetic radiation. By way of example, but not limitation, the light source can be a single light emitting diode (LED), multiple LEDs arranged to illuminate different portions of the navigation surface, an array of LEDs designed to emit light 123 at a desired average intensity, or a laser light source. In an embodiment, the wavelength of light emitted from the light source is selected to maximize reflection of the light from the navigation surface and to enable the reflected light to be distinguished from unwanted light signals. In addition, the wavelength of the light can be chosen based on user or manufacturer preferences. For example, some manufacturers may prefer blue light to red light in certain applications. The light source can be, for example, in an "on state" in a continuous mode with either a steady or variable amount of illumination or in a duty-cycle mode, where the light source is pulsed on and off to control the exposure by servoing the average amount of light. The intensity of illumination can be controlled using, for example, known techniques.

In the embodiment of FIG. 3, the illumination optics 124 provide a surface, referred to as a finger interface surface 130, on which the finger 120 can be placed and moved to perform navigation functions. The illumination optics can also be used to direct the light from the light source 122 towards the finger interface surface at the desired angle of incidence. For example, illumination optics could consist of LED dome lenses or a light pipe that channels the light towards the finger interface surface with a minimal amount of light loss. In an embodiment, the angle of incidence for illuminating a navigation surface (e.g., a user's finger) is a grazing angle within the range of five to twenty degrees. An angle of incidence in this range provides a high signal-to-noise ratio of image data representing inherent structural features of the navigation surface (e.g., a user's finger) being imaged. However, due to the transparency of skin, such oblique angles may not be necessary for adequately capturing image data representing an image of the user's finger. Therefore, the selection of the angle of incidence is largely dependent upon the design of the image acquisition device, such as the number and type of LEDs used, the thickness of the imaging system in the z-direction and the optics (illumination and imaging system) employed. In addition, in other embodiments, depending on the angle of incidence, the light may be directed to the finger interface surface using a total internal reflection (TIR) mechanism or a reflected light mechanism. Other embodiments of illumination optics are also possible.

In an embodiment, the illumination optics 124 are formed from a transparent optical element such as glass or plastic that is of a size sufficient to enable the optical navigation sensor to capture an image of at least a portion of the finger 120. In one embodiment, the finger interface surface 130 provides a sensing area of approximately 16 mm². In one embodiment, the finger interface surface is approximately 4 mm in the x-direction by 4 mm in the y-direction. In an embodiment such as an optical mouse, the illumination optics may have different specification.

The imaging optics 126 of the imaging system 110 direct and focus reflected light onto the sensor array 128. The imaging optics may include a lens, lenses, and/or a light pipe. In alternative embodiments, other imaging optics may be utilized and in still other embodiments, imaging optics may not be used and/or the imaging optics may be partially or fully integrated with the illumination optics.

The sensor array 128 of the imaging system 110 generates frames of image data from light that is reflected at the finger interface surface 130 and incident on the sensor array. In an embodiment, the sensor array includes an array of distinct photodetectors (not shown), for example, a 16×16 or 32×32 array of distinct photodetectors configured to detect light that is reflected from an illuminated spot on a finger at the finger interface surface. Each of the photodetectors in the sensor array generates light intensity information that is output as a digital value (e.g., an 8-bit digital pixel value). Image information is captured by the sensor array in frames, where a frame of image information includes a set of simultaneously captured values for each distinct photodetector in the sensor array. Image frames captured by the sensor array include data that is indicative of features on the finger 120. The rate of image frame capture and tracking resolution can be programmable. In an embodiment, the image frame capture rate ranges up to 2,300 frames per second with a resolution of 800 counts per inch (cpi). Although some examples of frame capture rates and resolutions are provided, different frame capture rates and resolutions are contemplated. Additionally, as is described below, the resolution of the sensor array may be adjusted as desired to adapt to the speed of a moving finger.

In an embodiment, each photodetector of the sensor array 128 has a photo sensitive region between 5 and 60 μm square, with the spacing between the photodetectors designed to achieve the desired spatial resolution of the sensor array. Regardless of the desired spatial resolution, the size of the photodetectors and the spacing between the photodetectors are configured to provide at least one, and preferably more than one, photodetector per image feature and the overall size of the photodetector array is made large enough to receive an image having several features.

The sensor array 128 provides image information (e.g., raw pixel values) to the navigation engine 112. The navigation engine is configured to output two-dimensional movement information in response to the image information from the sensor array. The two-dimensional movement information is indicative of lateral movement of the finger 120 relative to the sensor array and typically includes two orthogonal components, e.g., an x-axis component (DX) and a y-axis component (DY). The x-axis component is indicative of relative movement in the x direction and the y-axis component is indicative of relative movement in the y direction, see x and y axes in FIG. 1. In an embodiment, the navigation engine compares successive image frames from the sensor array to determine the movement of image features between frames. In particular, the navigation engine determines movement by correlating common features that exist in successive image frames. The movement between image frames is expressed in terms of movement vectors in, for example, the x and y directions (e.g., DX and DY). The movement vectors, sometimes referred to as "counts," are then output to the microcontroller as "native" lateral movement information. The lateral movement information output from the optical navigation sensor is referred to as "native" lateral movement information because the information has not yet been processed by the microcontroller. In an embodiment, each x-axis movement vector is a 1-byte digital value and each y-axis movement vector is a 1-byte digital value. The native lateral movement information is used by the microcontroller to generate lateral movement information that is output to the CPU. Similar movement tracking techniques are used in optical mouse technology and more detailed descriptions of exemplary navigation sensor movement tracking techniques are provided in U.S. Pat. No. 5,644,139, entitled NAVIGATION TECHNIQUE FOR DETECTING MOVEMENT OF NAVIGATION SENSORS RELATIVE TO AN OBJECT, and U.S. Pat. No. 6,222,174, entitled METHOD OF CORRELATING IMMEDIATELY ACQUIRED AND PREVIOUSLY STORED FEATURE INFORMATION FOR MOTION SENSING, both of which are incorporated by reference herein.

Although the optical navigation device 102 and the optical navigation sensor 202 of FIGS. 1-3 are described as interacting with a finger, other body parts, such as a thumb, a toe, or a tongue, could be used to control navigation. Additionally, other non-human objects or surfaces, such as a glove, a pencil erasure, or any other navigation surface, could be used to control navigation. Additionally, although the system of FIG. 3 is described with reference to optical finger navigation, the same basic components are used in an optical mouse application in which the finger is replaced by a surface such as a desktop and the optical navigation sensor 202 is rotated one-hundred and eighty degrees such that the desktop is illuminated by the light source and light reflected from the desktop is detected by the sensor array 128.

In an embodiment, the microcontroller 204 of FIG. 2 is configured to process the native movement information that is received from the optical navigation sensor 202 according to an adaptive navigation algorithm or a sensor resolution adjustment algorithm. In an embodiment, the adaptive navigation algorithm is an algorithm that helps to smooth the perceived cursor tracking when a user swipes or skates a finger across the optical navigation sensor. The adaptive navigation algorithm is especially applicable to large and/or wide screen applications to maintain tracking accuracy during icon selection. In an embodiment, the adaptive navigation algorithm is applicable to display sizes ranging from 10 inches up to 60 inches although the algorithm is also applicable to smaller or larger screen sizes. When a user skates or swipes a finger across the finger interface surface to navigate a cursor across a wide screen display, the user expects smooth cursor tracking and fast cursor movement (vertically, horizontally, and/or diagonally) from one end of the display to the other (at much higher resolution) while maintaining accuracy to be able to select desired icons correctly. In an embodiment, the native lateral movement information (DX and DY) reported by the optical navigation sensor is smooth filtered and the filtered output can be transformed by another algorithm which increases the lateral movement information counts via scaling. For example, the DX and DY counts can be scaled using a multiplier.

Figure 4:
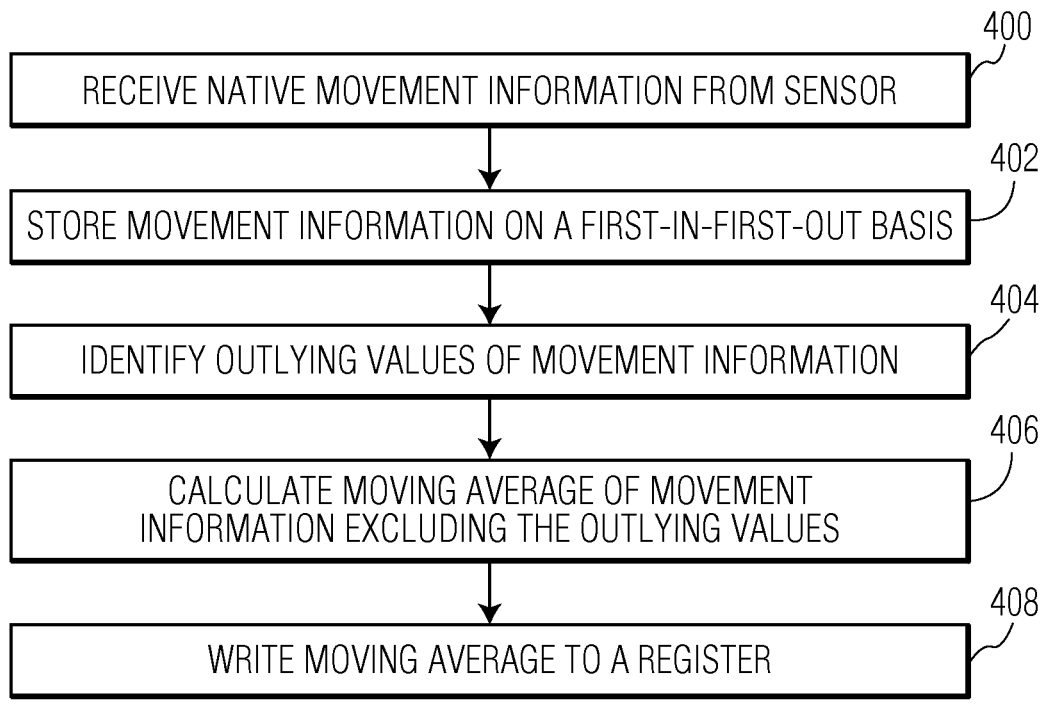
FIG. 4 is a process flow diagram of a technique for processing movement information.

An embodiment of adaptive navigation algorithm is described with reference to FIG. 4. At block 400, native movement information is received at the microcontroller from the optical navigation system as, for example, sets of DX and DY counts. At block 402, sets of DX and DY counts are stored in the microcontroller. For example, a fixed number of sets of DX and DY counts are stored in the microcontroller on a rolling, or "first-in-first-out," basis. In an embodiment, twelve sets of DX and DY counts are stored in the microcontroller on a rolling basis, with each set of DX and DY counts containing two bytes of lateral movement information (e.g., 1-byte of x-axis movement information and 1-byte of y-axis movement information) for a total of 24 bytes of lateral movement information stored in the microcontroller. Although an example of the number of sets of lateral movement information that are stored and the size of the stored sets of lateral movement information is described, other numbers of sets and sizes of sets of the native lateral movement information are possible.

At block 404, the magnitude of the sets of native movement information are compared to each other and values that represent the largest movement and the smallest movement, also referred to as the "outlying" values, are identified. For example, the largest DX and DY counts are identified and the smallest DX and DX counts are identified. In another embodiment, the set of DX and DY counts that represents the largest magnitude of movement is identified and the set of DX and DY counts that represents the smallest magnitude of movement is identified. As is described below with reference to block 406, the "outlying" values are excluded from a moving average calculation. The number of values that are identified as outlying values is implementation specific.

At block 406, the collection of stored data is averaged to find a moving average of the movement during a given time interval. The averaging involves disregarding the outlying DX and DY values that were identified at block 404. For example, the two largest and the two smallest DX values are disregarded and the two largest and the two smallest DY values are disregarded. In an embodiment, the "largest" and "smallest" refers to the magnitude of movement as represented by the lateral movement information. The moving average is repeatedly calculated using the most recent sets of stored movement information and disregarding the outlying values. Although the two largest and two smallest values are disregarded, other numbers of values can be identified as outlying values and disregarded. At block 408, the calculated moving averages are written to a register within the microcontroller for possible further processing. The effect of eliminating the outlying values and calculating a moving average over a given time interval is a smoothing of the movement information. In an embodiment, the time interval over which the stored sets of movement information are accumulated is approximately 100 milliseconds.

In an embodiment, the moving average is calculated by finding the combined lateral movement in the x-direction minus the two largest and two smallest outlying values and the combined lateral movement in the y-direction minus the two largest and two smallest outlying values, and dividing the combined values by the total number of sets of data minus four. For example, if twelve sets of data are continuously stored in the microcontroller 204 and the four outlying values in each direction are ignored, then the moving average of lateral movement in the x and y directions is calculated by dividing the combined lateral movement in the x-direction and the combined lateral movement in the y-direction by eight. Other techniques for calculating the moving average may be implemented.

As stated above, the microcontroller 204 is also configured to implement a sensor resolution adjustment algorithm. The sensor resolution adjustment algorithm enables a cursor to be accurately positioned under various speed conditions. The sensor resolution adjustment algorithm enables accurate cursor tracking by adjusting the resolution of the sensor array in response to the relative speed of a user's finger. For example, when the speed of a user's finger is relatively slow, the resolution of the sensor array 128 is reduced to provide precise navigation and when the speed of the finger 120 is relatively fast, the resolution of the sensor array is increased to accommodate high-speed cursor movement. In an embodiment, the sensor resolution adjustment algorithm includes a manual speed switching mode and an automatic speed switching mode.

When set to the manual speed switching mode, the resolution of the sensor array 128 is fixed at all times. However, the resolution can be changed on the fly to suit the needs of an application by setting lower resolution with slower finger movement (or when precision placement is required) and by setting higher resolution when higher finger speed. Resolution adjustment can be accomplished by having the microcontroller monitor the reported movement information and changing the sensor resolution setting as required by the application.

In automatic speed switching mode, the optical navigation sensor 202 monitors the native movement information and changes the resolution of the sensor array 128 automatically. There are also options to change the monitoring rate, wakeup resolution, and step-by-step resolution switching control within the optical navigation sensor. A description of an implementation of a sensor resolution adjustment algorithm, referred to as "speed switching," is found in the document: *A320 Optical Finger Navigation Sensor, Application Note 5423*, Avago Technologies, Jul. 29, 2009, which is incorporated by reference herein.

In an embodiment, the resolution of the sensor array 128 is controlled by setting register values. An example of resolution adjustment register values for controlling the resolution of a sensor array is shown in Table 1. In particular, Table 1 depicts example speed switching register values for 10-11 inch screens. 10-11 inch screens are typically used in applications such as netbooks or tablet computers. Register values for other size screens are also possible. In an embodiment, the register values can be written by the microcontroller or the CPU to the optical navigation sensor during a startup or initialization procedure.

TABLE 1

| CPI change | Speed (ips) | Optical Navigation Sensor Register Address | Register value (hex) |
|---|---|---|---|
| 250 to 500 | 0.375 | 0x64 | 03 |
| 500 to 250 | 0.375 | 0x65 | 03 |
| 500 to 750 | 0.5 | 0x66 | 04 |
| 750 to 500 | 0.5 | 0x67 | 04 |
| 750 to 1000 | 0.625 | 0x68 | 05 |
| 1000 to 750 | 0.5 | 0x69 | 04 |
| 1000 to 1250 | 0.625 | 0x6a | 05 |
| 1250 to 1000 | 0.5 | 0x6b | 04 |

Figure 5:
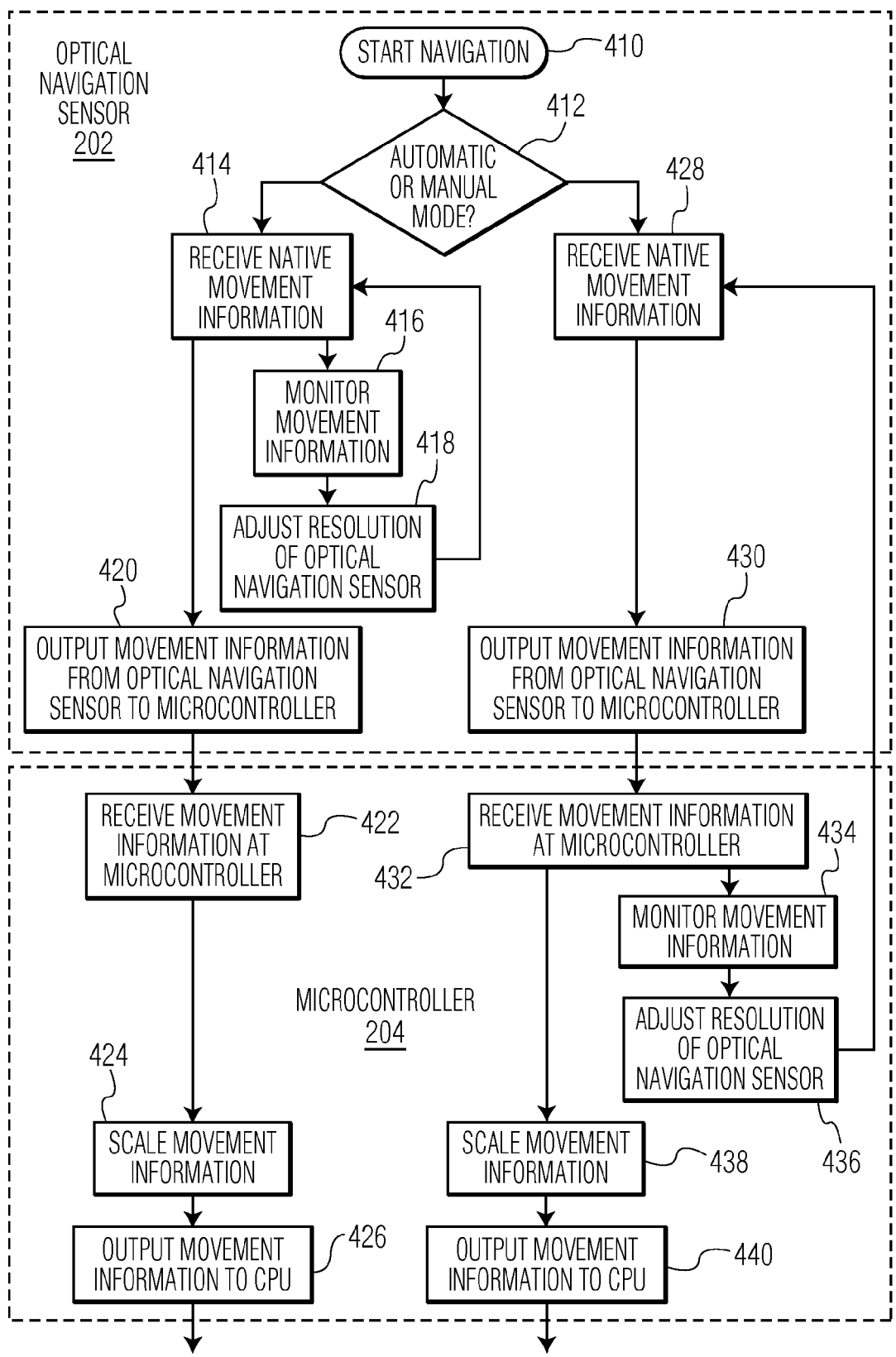
FIG. 5 is a process flow diagram of a technique for processing movement information.

An embodiment of a sensor resolution adjustment algorithm is described below with reference to FIG. 5. The process of optical navigation starts at block 410. At decision point 412, it is determined whether or not the optical navigation sensor is in automatic speed switching mode or manual speed switching mode.

If the optical navigation sensor is in automatic speed switching mode, at block 414, the optical navigation sensor 202 receives native movement information. Additionally, at block 416, the optical navigation sensor monitors the native movement information. At block 418, the optical navigation sensor adjusts the resolution of the sensor array in response to the native movement information. If the resolution of the optical navigation sensor is at the desired setting, no adjustment may be needed. Subsequent native movement information is generated using the adjusted sensor array resolution. At block 420, the movement information is output from the optical navigation sensor to the microcontroller 204. At block 422, movement information is received at the microcontroller and at block 424, the movement information may be scaled. At block 426, the movement information is output from the microcontroller to the CPU 206.

If the optical navigation sensor 202 is in manual speed switching mode, then at block 428, native movement information is received and at block 430, the native movement information is output from the optical navigation sensor to the microcontroller. At block 432, the native movement information is received at the microcontroller 204. Additionally, at block 434, the native movement information is monitored and at block 436, the resolution of the optical navigation sensor can be adjusted by the microcontroller based on the magnitude of the native movement information. At block 438, the movement information may be scaled and at block 440, the movement information is output from the microcontroller to the CPU.

In accordance with an embodiment of the invention, the algorithm that is used to process the native movement information is selected in response to the speed of the relative movement of a navigation surface (e.g., a user's finger). In particular, a speed threshold is established and the native movement information is processed using an adaptive navigation algorithm if the relative speed of the navigation surface is greater than the speed threshold or processed using a sensor resolution adjustment algorithm if the speed of the navigation surface is less than the speed threshold.

An embodiment of a technique for processing the movement information using a speed threshold is described with reference to FIG. 6. In an embodiment, the algorithm selection process is implemented at the microcontroller 204 via firmware that is stored and executed at the microcontroller. At block 450, native movement information is received by the microcontroller from the optical navigation sensor 202. At block 452, the relative speed of a navigation surface is determined from the native movement information. At decision point 454, it is determined whether or not the relative speed of the navigation is greater than the speed threshold. In an embodiment, the speed threshold is set at three inches per second (ips), although other speed thresholds are possible. For example, a speed threshold in the range of 2-7 ips is possible and a speed threshold in the range of 5-7 ips is possible.

If the relative speed of the navigation surface is greater than the speed threshold, then at block 456, the native movement information is processed using an adaptive navigation algorithm. For example, the native movement information is processed using the adaptive navigation algorithm as described above with reference to FIG. 4. At block 458, movement information generated using the adaptive navigation algorithm is reported. For example, the movement information is read to a storage register within the microcontroller. At block 460, the reported movement information can be further processed by the microcontroller before being output to the CPU 206. For example, the movement information can be scaled by the microcontroller by multiplying the movement information by a scaling factor. In an embodiment, the scaling factor can be the same in both the x and y directions or the scaling factor can be set independently for each of the x and y directions.

If the relative speed of the navigation surface is less than the speed threshold, then at block 462, the native movement information is processed using a sensor resolution adjustment algorithm. For example, the native movement information is processed using the sensor resolution adjustment algorithm as described above with reference to FIG. 5. At block 464, the movement information generated using the sensor resolution adjustment algorithm is reported. For example, the movement information is read to a storage register within the microcontroller. At block 466, the movement information is output to the CPU and the process is continued/repeated for subsequently received native movement information.

Figure 6:
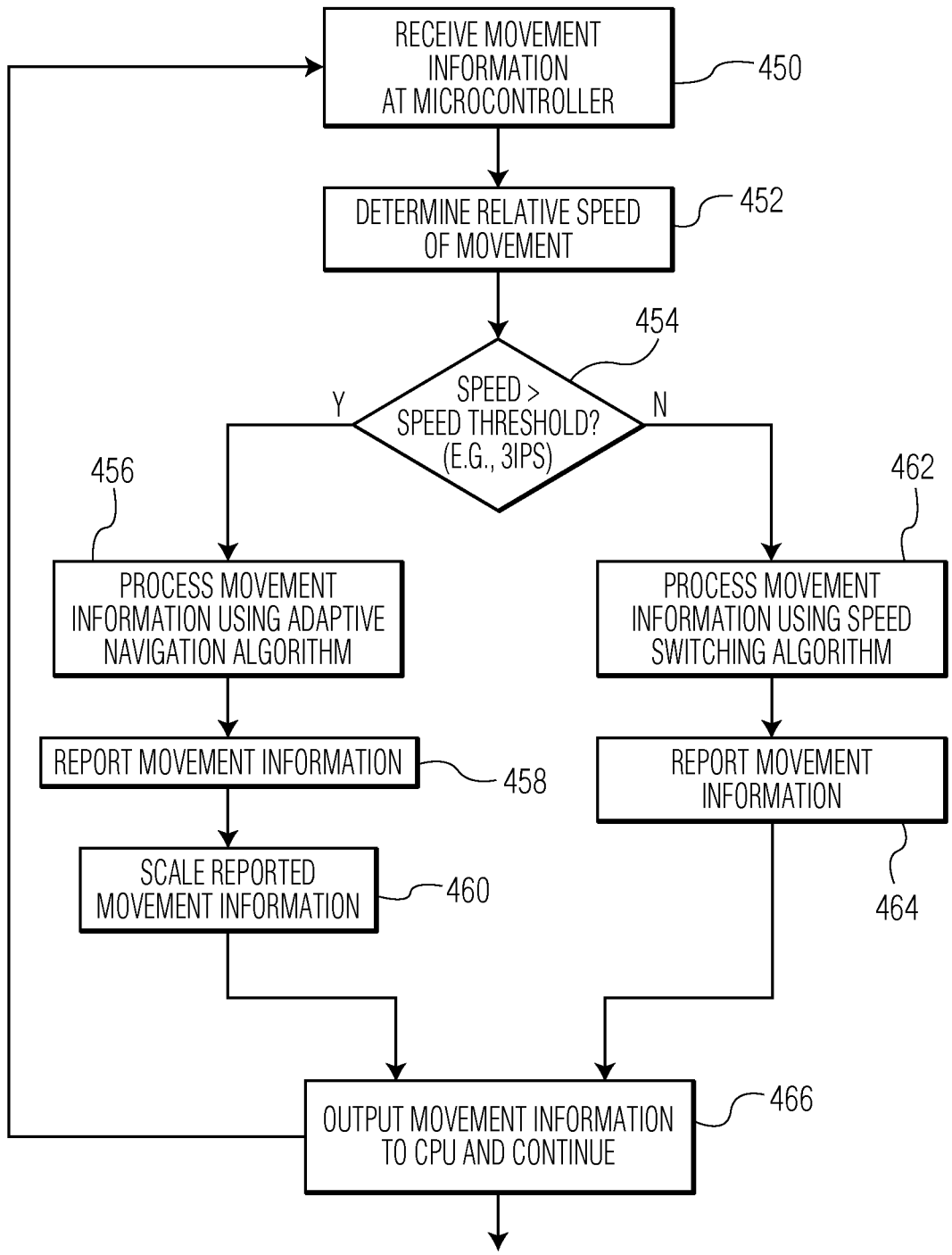
FIG. 6 is a process flow diagram of a technique for processing movement information that includes the techniques from FIGS. 4 and 5.
Figure 7:
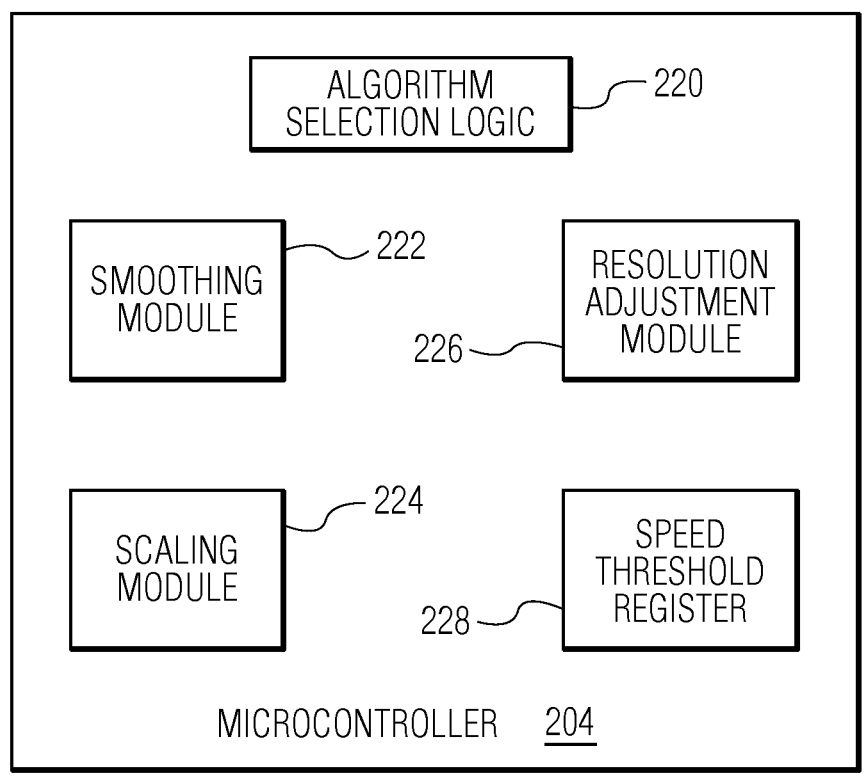
FIG. 7 depicts an expanded view of an embodiment of the microcontroller of FIG. 2.

In an embodiment, the processing technique of FIG. 6 is implemented in firmware in the microcontroller 204. FIG. 7 depicts an embodiment of the microcontroller from FIG. 2 that includes algorithm selection logic 220, a smoothing module 222, a scaling module 224, a resolution adjustment module 226, and a speed threshold register 228. In the embodiment of FIG. 7, the speed threshold register is configured to store a value that is indicative of the speed threshold. The algorithm selection logic includes firmware that when executed within the microcontroller determines the relative speed of a navigation surface and selects the processing algorithm accordingly. The smoothing module includes firmware that when executed within the microcontroller implements an adaptive navigation algorithm such as the adaptive navigation algorithm as described above with reference to FIG. 4. The scaling module includes firmware that when executed within the microcontroller implements scaling as described above with reference to FIGS. 5 and 6 and the resolution adjustment module includes firmware that when executed within the microcontroller implements the microcontroller portion of the sensor resolution adjustment algorithm as described above with reference to FIG. 5.

Figure 8:
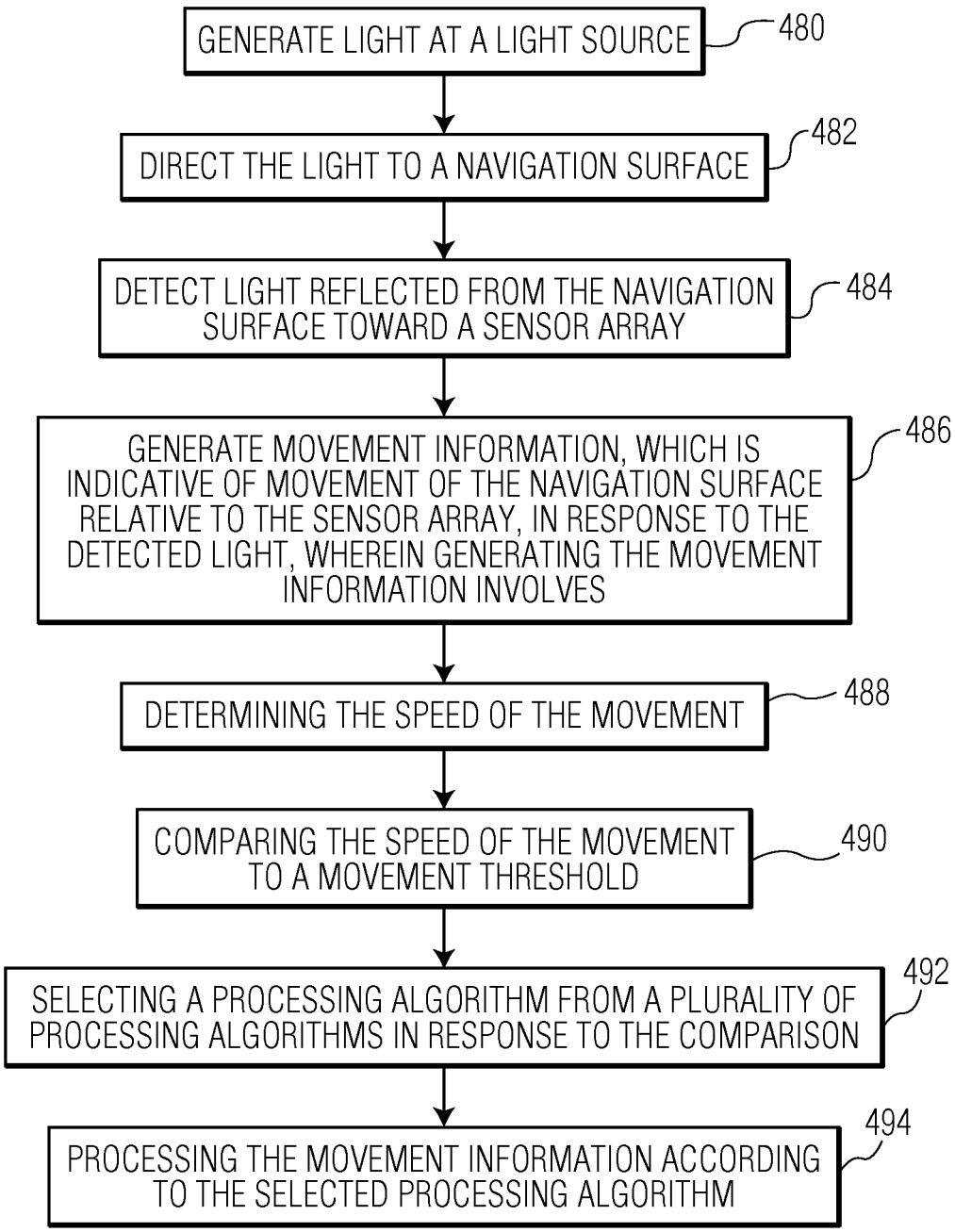
FIG. 8 is a process flow diagram of a method for optical navigation in accordance with an embodiment of the invention.

FIG. 8 is a process flow diagram of a method for optical navigation in accordance with an embodiment of the invention. At block 480, light is generated at a light source. At block 482, the light is directed to a navigation surface. At block 484, light reflected from the navigation surface toward a sensor array is detected. At block 486, movement information, which is indicative of movement of the navigation surface relative to the sensor array, is generated in response to the detected light. At blocks 488-494, generating the movement information involves determining the speed of the movement (488), comparing the speed of the movement to a movement threshold (490), selecting a processing algorithm from a plurality of processing algorithms in response to the comparison (492), and processing the movement information according to the selected processing algorithm (494).

Although the technique for processing native movement information is described with reference to an optical finger navigation device in FIG. 3, the technique is also applicable to other optical navigation devices. For example, the technique for processing native movement information is applicable to an optical mouse that includes an optical navigation sensor 202 similar to that described with reference to FIG. 3. In an optical mouse application, the optical navigation sensor and the microcontroller 204 of FIG. 2 are located within a housing of an optical mouse and the CPU 206 is located within a physically separate computer system, such as a desktop or laptop personal computer. Other embodiments or arrangements of the optical navigation system, the microcontroller, and the computer system are also possible.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for optical navigation, the method comprising:
generating light at a light source;
directing the light to a navigation surface;
detecting light reflected from the navigation surface toward a sensor array;
generating movement information, which is indicative of movement of the navigation surface relative to the sensor array, in response to the detected light, wherein generating the movement information comprises;
determining the speed of the movement;
comparing the speed of the movement to a speed threshold;
selecting a processing algorithm from a plurality of processing algorithms in response to the comparison; and
processing the movement information according to the selected processing algorithm:
wherein the plurality of processing algorithms comprises an adaptive navigation algorithm and a sensor resolution adjustment algorithm, and wherein the adaptive navigation algorithm is selected if the speed of the movement is greater than the speed threshold and the sensor resolution adjustment algorithm is selected if the speed of the movement is less than the speed threshold;
wherein:
the adaptive navigation algorithm comprises calculating a moving average of movement information, scaling the moving average of the movement information, and outputting movement information after being averaged and scaled; and
the sensor resolution adjustment algorithm comprises switching the resolution of the sensor array in response to the speed of the movement;
wherein the adaptive navigation algorithm further comprises storing a finite number of movement values on a first-in-first-out basis, excluding at least one outlying movement value, and averaging the remaining movement values using the movement values that are stored on the first-in-first-out basis.

2. The method of claim 1 wherein the speed threshold is in the range of 2-7 inches per second.

3. The method of claim 1 wherein at least one movement value representing the smallest movement is excluded from the moving average calculation and wherein at least one movement value representing the largest movement is excluded from the moving average calculation.

4. The method of claim 1 wherein the selection of the processing algorithm is implemented by executing firmware.

5. A user input device comprising:
a light source configured to provide light from the light source to a navigation surface;
a sensor array configured to detect light reflected from a navigation surface;
a navigation engine coupled to the sensor array, the navigation engine configured to generate movement information, which is indicative of movement of the navigation surface relative to the sensor array, in response to the detected light; and
a microcontroller connected to receive the movement information from the navigation engine and configured to:
determine the speed of the movement across the navigation surface;
compare the speed of the movement to a speed threshold;
select a processing algorithm from a plurality of processing algorithms in response to the comparison; and
process the movement information according to the selected processing algorithm:
wherein the plurality of processing algorithms comprises an adaptive navigation algorithm and a sensor resolution adjustment algorithm, and wherein the adaptive navigation algorithm is selected if the speed of the movement is greater than the speed threshold and the sensor resolution adjustment algorithm is selected if the speed of the movement is less than the speed threshold; and
wherein:
the adaptive navigation algorithm comprises calculating a moving average of movement information, scaling the moving average of the movement information, and outputting movement information after being averaged and scaled, wherein the adaptive navigation algorithm further comprises storing a finite number of movement values on a first-in-first-out basis, excluding at least one outlying movement value, and averaging the remaining movement values using the movement values that are stored on the first-in-first-out basis; and
the sensor resolution adjustment algorithm comprises switching the resolution of the sensor array in response to the speed of the movement.

6. The user input device of claim 5 wherein the adaptive navigation algorithm further comprises storing a finite number of movement values, excluding at least one outlying movement value, and averaging the remaining movement values.

7. The user input device of claim 6 wherein at least one movement value representing the smallest movement is excluded from the moving average calculation and wherein at least one movement value representing the largest movement is excluded from the moving average calculation.

8. The user input device of claim 5 wherein the selection of the processing algorithm is implemented by executing firmware in the microcontroller, and wherein the microcontroller receives native movement information from the navigation engine and wherein the speed is determined from the native movement information.

9. A user input device comprising:
an optical element comprising a navigation surface;
a light source in optical communication with the navigation surface and configured to provide light from the light source to the navigation surface;
a sensor array configured to detect light reflected from the navigation surface;
a navigation engine coupled to the sensor array, the navigation engine configured to generate movement information, which is indicative of movement of the navigation surface relative to the sensor array, in response to the detected light; and
wherein the user input device is configured to:
determine the speed of the movement across the navigation surface;
compare the speed of the movement to a speed threshold;
select an adaptive navigation algorithm if the speed of the movement is greater than the speed threshold and select a different processing algorithm if the speed of the movement is less than the speed threshold; and process the movement information according to the selected processing algorithm;

wherein the adaptive navigation algorithm comprises calculating a moving average of movement information, scaling the moving average of the movement information, and outputting movement information after being averaged and scaled, and wherein the adaptive navigation algorithm further comprises storing a finite number of movement values on a first-in-first-out basis, excluding at least one outlying movement value, and averaging the remaining movement values using the movement values that are stored on the first-in-first-out basis, and wherein at least one movement value representing the smallest movement is excluded from the moving average calculation and wherein at least one movement value representing the largest movement is excluded from the moving average calculation.

* * * * *